United States Patent
Jessee et al.

(10) Patent No.: US 7,136,808 B2
(45) Date of Patent: Nov. 14, 2006

(54) DETECTION AND CORRECTION OF ERRORS IN GERMAN GRAMMATICAL CASE

(75) Inventors: Andrea Jessee, Bothell, WA (US); Yvonne Quirmbach-Brundage, Kirkland, WA (US); Antje Helfrich, Seattle, WA (US); Paul Cardon, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1133 days.

(21) Appl. No.: 09/800,064

(22) Filed: Mar. 6, 2001

(65) Prior Publication Data

US 2002/0128819 A1 Sep. 12, 2002

Related U.S. Application Data

(60) Provisional application No. 60/242,320, filed on Oct. 20, 2000.

(51) Int. Cl.
*G06F 17/21* (2006.01)
(52) U.S. Cl. .................. 704/10; 704/8; 704/9; 715/533
(58) Field of Classification Search ............. 704/10, 704/8, 9, 533; 715/533
See application file for complete search history.

(56) References Cited

U.S. PATENT DOCUMENTS

| | | | |
|---|---|---|---|
| 4,594,686 A * | 6/1986 | Yoshida | 704/8 |
| 4,864,502 A * | 9/1989 | Kucera et al. | 704/8 |
| 4,887,212 A * | 12/1989 | Zamora et al. | 704/8 |
| 5,559,693 A * | 9/1996 | Anick et al. | 704/9 |
| 5,878,385 A * | 3/1999 | Bralich et al. | 704/9 |
| 6,424,983 B1 * | 7/2002 | Schabes et al. | 715/533 |
| 6,442,524 B1 * | 8/2002 | Ecker et al. | 704/277 |

OTHER PUBLICATIONS

"From the Developer to the Learner: Describing Grammar—Learning Grammar", by M. Schulze, *ReCALL: The Journal of EUROCALL*, vol. 11, No. 1, pp. 117-124 (May 1999).
"Francophone Stylistic Grammar Checking (FSGC) Using Link Grammars", by T. Brehony et al., *Computer Assisted Language Learning*, vol. 7, No. 3, pp. 257-269 (1994).
"Implementation of the Formalism for a Grammar Checker", by J. Hric, *Proc 2nd Int Conf. Practical Application of Prolog.*, pp. 271-280, (1994).
"I Ate The Fish With a Fork", by P. Rutten, *Language Technology*, vol. 10, pp. 26-30, (1988).

(Continued)

*Primary Examiner*—Richemond Dorvil
*Assistant Examiner*—Qi Han

(57) ABSTRACT

A method and apparatus for grammar checking a German language sentence. The grammar checker parses the sentence into a verb phrase and an initial noun phrase combination associated with the verb phrase. The grammar checker accesses a morphology table to define an initial case combination associated with the initial noun phrase combination. The grammar checker accesses a lexicon to define a correct case combination associated with the verb phrase. The grammar checker compares the initial case combination to the correct grammatical case combination and generates a case error combination. The grammar checker generates a combination of sentence rewrites that includes a grammatical case change to a noun phrase that corrects the case error combination.

18 Claims, 7 Drawing Sheets

OTHER PUBLICATIONS

"Analyse Syntaxique Globale & Correction Grammaticale Etendue", by R. Ashori-Hechmati, *Twelfth International Conference Artificial Intelligence, Expert Systems*, pp. 41-53, (1992).

"La Vérificiation et la Correction Automatique de Textes: Le Système VORTEX", by G. Perennou et al., *Technique et Science Informatique*, vol. 5, No. 4, pp. 285-305, (1986).

"Analyse Automatique d'erreurs: Stratégie Linguistique et Computationnelle", by J. Chanod, *Actes du Colloque Informatique et Langue Naturelle*, pp. 55-71, (1991).

"Problemes D'Analyse Syntaxique Pour Les Correcteurs Grammaticaux", by P. Blache, *Universite de Neuchatel*, pp. 163-174, (1991).

* cited by examiner

| | MASCULINE SINGULAR | FEMININE SINGULAR | NEUTER SINGULAR | MASCULINE, FEMININE & NEUTER PLURAL |
|---|---|---|---|---|
| SUBJECT NOMINATIVE | der neue ⎫<br>neuer ⎬ Mann 1<br>ein neuer ⎭ | die neue ⎫<br>neue ⎬ Hand 1<br>eine neue ⎭ | das neue ⎫<br>neues ⎬ Haus 1<br>ein neues ⎭ | die neuen ⎫<br>neue ⎬ Männer 3<br>ihre neuen ⎭ |
| INDIRECT OBJECT DATIVE | dem neuen ⎫<br>neuem ⎬ Mann(e) 1+(e)<br>einem neuen ⎭ | der neuen ⎫<br>neuer ⎬ Hand 1<br>einer neuen ⎭ | dem neuen ⎫<br>neuem ⎬ Haus(e) 1+(e)<br>einem neuen ⎭ | den neuen ⎫<br>neuen ⎬ Männern 3+(n)<br>ihren neuen ⎭ |
| DIRECT OBJECT ACCUSATIVE | den neuen ⎫<br>neuen ⎬ Mann 1<br>einen neuen ⎭ | die neue ⎫<br>neue ⎬ Hand 1<br>eine neue ⎭ | das neue ⎫<br>neues ⎬ Haus 1<br>ein neues ⎭ | die neuen ⎫<br>neue ⎬ Männer 3<br>ihre neuen ⎭ |

FIG. 1

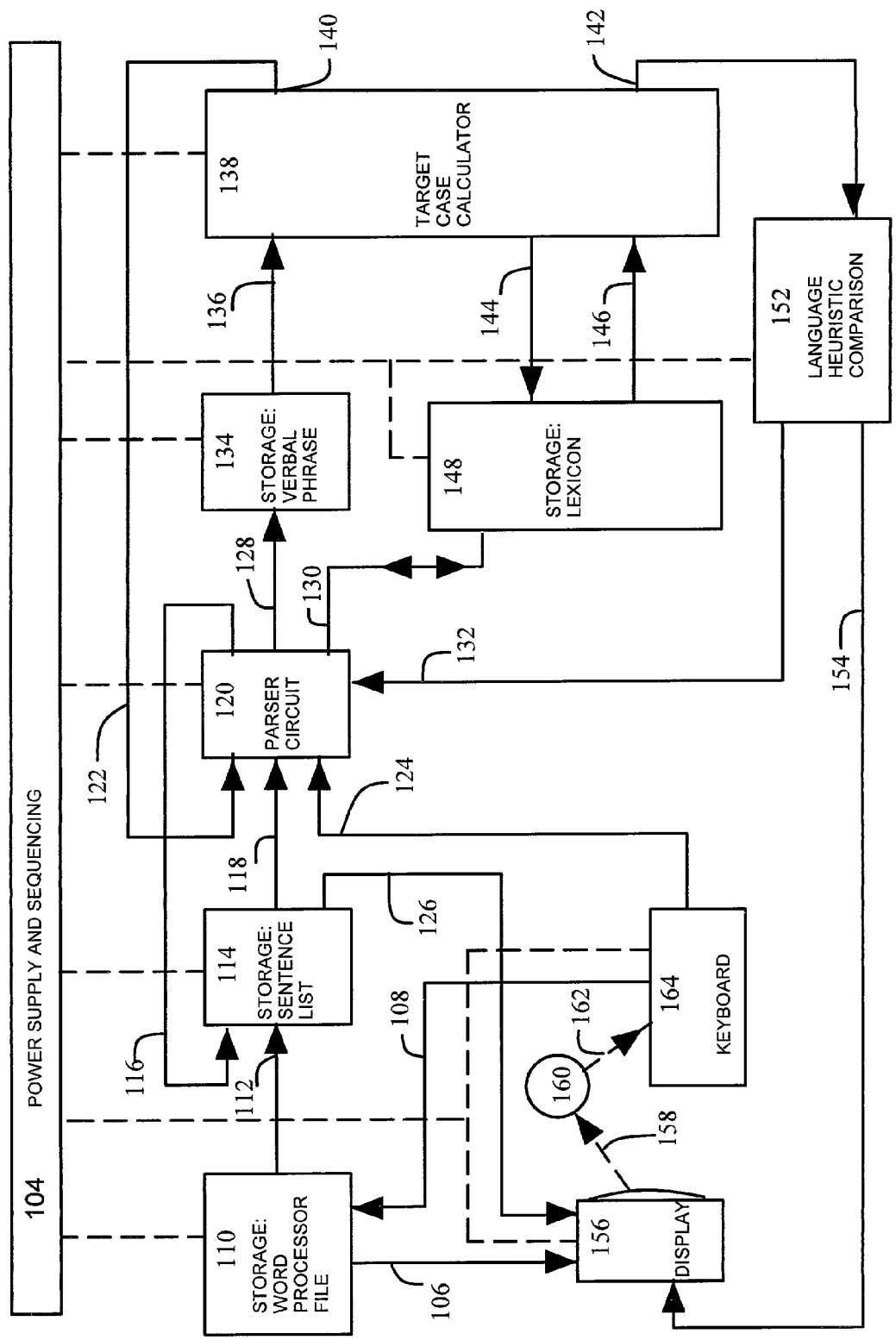

DETECTION AND CORRECTION OF ERRORS IN GERMAN GRAMMATICAL CASE

CROSS REFERENCE TO RELATED APPLICATION

This application claims priority benefits from U.S. Provision Application 60/242,320 titled DETECTION & CORRECTION OF ERRORS IN GERMAN GRAMMATICAL CASE, filed Oct. 20, 2000.

BACKGROUND OF THE INVENTION

Text processing computer applications, such as word processor arid email applications, use grammar-checking modules. A grammar checking module tests a sentence of text for errors or deviations from simple grammar rules for a particular language being used.

There is a desire to improve German language grammar checkers so that the grammar checker can detect errors in case endings of subjects, direct objects and indirect objects in verbal phrases. However, with the German language, difficult problems are encountered in any attempt to check for errors in case endings of subjects, direct objects and indirect objects.

The problem of detecting German case ending errors is much more complex than a writer's task in selecting correct case endings because the grammar checker does not have access to the writer's intended meaning. When presented with a sentence or phrase that has an error in a case ending, the grammar checker does not have access to the intended meaning of a sentence or phrase to help ascertain which case was intended for each noun phrase. German sentence word order is variable, and provides only a little information concerning likely grammatical cases of noun phrases.

The grammar checking problem is also more complex because German case endings are not unique to a particular grammatical case. For articles, adjectives or nouns, the same case ending may be used for different cases depending on a complex combination of grammatical gender, whether a noun is singular or plural, or whether a "der" type word or an "ein" type determiner word precedes the adjective. Thus, case endings do not always reliably or uniquely predict the grammatical case of a noun phrase. There is a substantial problem in presenting a user with proposed case ending corrections with so much ambiguity in the available information, and so many possible combinations of grammatically correct proposed corrections when the writer's meaning is unknown.

A grammar checking module for text processing applications is needed to provide the desired checking of grammatical case ending of subjects, direct objects and indirect objects in German language phrases.

SUMMARY OF THE INVENTION a method and an apparatus for grammar checking a German language sentence is described. The grammar checker parses the sentence into a verb phrase and an initial noun phrase combination associated with the verb phrase. The grammar checker accesses a morphology table to define an initial case combination associated with the initial noun phrase combination. The grammar checker accesses a lexicon to define a correct case combination associated with the verb phrase. The grammar checker compares the initial case combination to the correct grammatical case combination and generates a case error combination. The grammar checker generates a combination of sentence rewrites that includes a grammatical case change to one noun phrase that corrects the case error combination.

BRIEF DESCRIPTION OF THE DRAWINGS

FIG. 1 illustrates a simplified table of exemplary German case endings as a function of case, number and gender.

FIG. 7 illustrates a block diagram of a second exemplary grammar checking circuit.

DETAILED DESCRIPTION OF THE PREFERRED EMBODIMENTS

Figure 2:
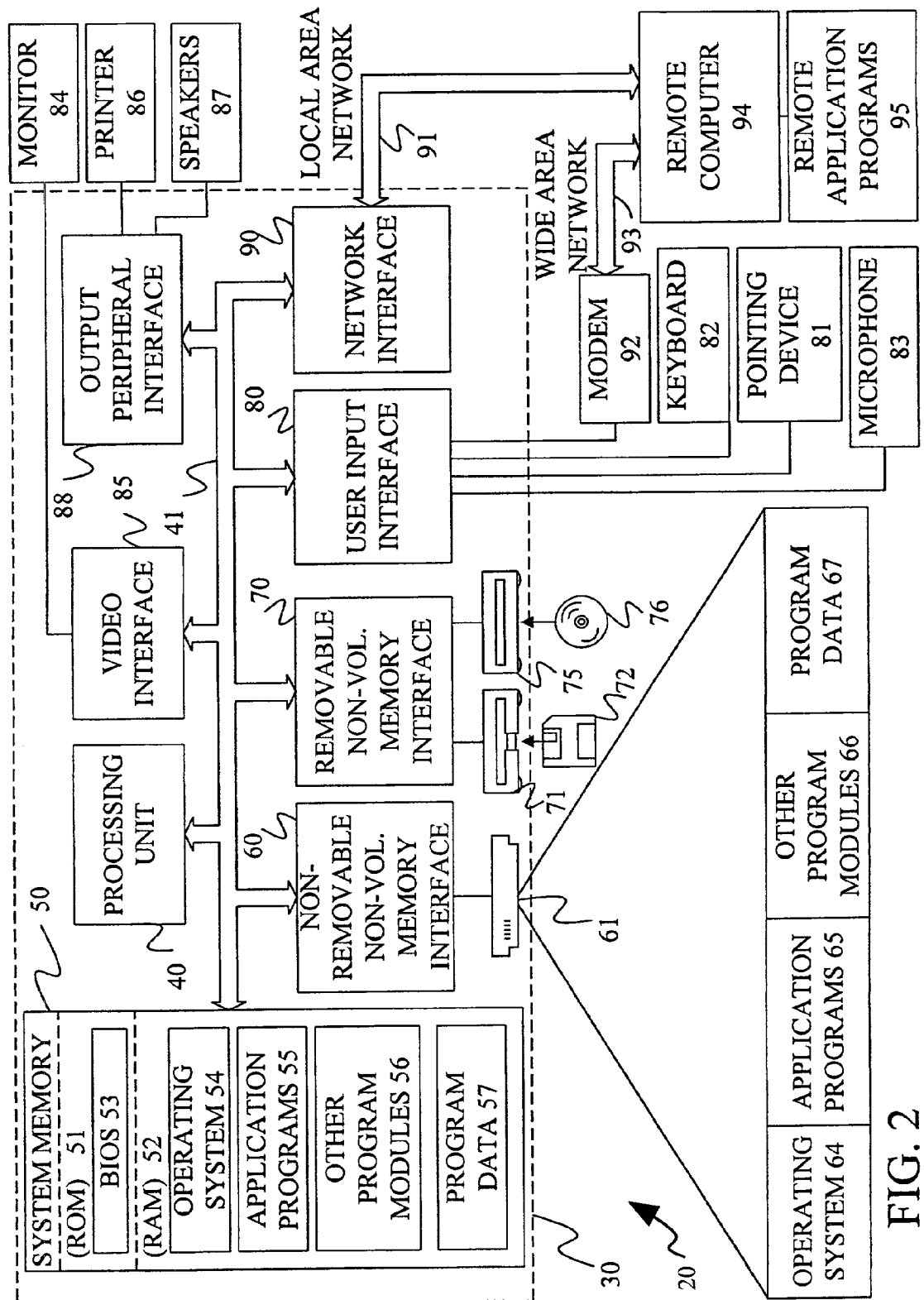
FIG. 2 illustrates a block diagram of a first exemplary grammar checking circuit

With the present invention, a grammar checker operates to check for errors in German case endings of subjects, direct objects and indirect objects of verbs in verbal phrases. This is done without having access to the writer's intended meaning for the verbal phrase. The grammar checker overcomes the problem that case endings are not unique to a particular case. The grammar checker provides a degree of reliability suitable for use with text processing computer applications. The grammar checker provides a reasonably limited number of proposed corrections to present to the user when a case error is detected.

In German, case endings indicate the case of a subject, a direct object or an indirect object of a verbal phrase. When case endings are accurate, they can convey a very important part of the meaning of a verbal phrase. If there are errors in case endings, the reader may get an erroneous meaning that is different than that intended by the writer.

In German, case endings are present on the noun as well as on any articles and adjectives that may be included in a noun phrase ("NP"). The case endings are complex and depend on the gender of the noun, whether the noun is singular or plural, and whether the noun is a subject (nominative case), direct object (accusative case) or indirect object (dative case) of the verb.

The plural forms of German nouns are irregular and may include changes to the ending as well as other orthographic changes in the noun. Plural forms of nouns must be memorized, or a dictionary or lexicon must be consulted.

German adjective endings are particularly complex since the adjective endings also vary depending upon whether the adjective follows a so-called "der" type word ("schwache Deklination," e.g., der, dieser, jener, jeder, welcher, solcher, aller), is preceded by a so-called "ein" word ("gemischte Deklination," e.g., ein, mein, sein, ihr, kein, unser, euer, dein, Ihr), or is preceded by neither a "der"- or an "ein"-type word. In some instances, when an adjective follows a noun that it modifies, the adjective case ending is omitted. In addition, there are accepted variations in the dative endings of masculine and neuter nouns.

Incorrect case endings can give a poor impression of the writer's skill, or can convey an unintended meaning to the reader. A writer in the German language can reliably select case endings for the subject, direct object, and indirect object by consulting a dictionary and a grammar book such as Duden's *Grammatik* or by reference to a simplified table of case ending examples similar to that illustrated in FIG. 1.

In FIG. 1, the number "1" refers to the first form (nominative singular) of a noun; the number "3" refers to the third form (nominative plural) of a noun as listed in a dictionary. For example, a writer may wish to use the phrase "the blue lake" as a singular indirect object in a sentence. The writer can first consult a dictionary to find the first form "See" meaning "lake" is masculine. Next, the writer consults a table like that in FIG. 1 and finds the intersection of the masculine singular column 10 with the indirect object (dative case) row 11. At this intersection, is an example 12 of endings for articles, adjectives and nouns for a masculine singular indirect object. By referring to this example 12, the writer can write "the blue lake" with the correct number, gender and case as "dem blauen See." FIG. 1 is a partial declension (Deklination) table illustrating examples of the inflection of the endings of determiners, adjectives and nouns for the three cases (nominative, dative, accusative) used to indicate the subject, indirect object and direct object of a verb in a German sentence.

The writer's task can be completed with few errors because the rules and exceptions to the rules are available to the writer, and the writer knows the intended meaning for the sentence. On the other hand, the problem for a grammar checker in checking for errors in German case endings is more complex and fraught with ambiguity. For example, when a German grammar checker encounters the noun "See" in a sentence, it is unknown whether the writer intends a masculine noun "See" meaning "lake (stehendes Binnengewässer)" or a feminine noun "See" meaning "ocean (Meer)." Dealing with such ambiguity in a grammar checker is explained below in connection with examples in FIGS. 3–7.

A phrase is provided to the grammar checker application by a parser, and the phrase may be a complete sentence, or a verbal phrase that is part of a sentence which can have some combination of subject, direct object or indirect object. The parser and the grammar checker are implemented in a computer environment.

Prior to a detailed discussion of the present invention, an overview of such a computer operating environment may be helpful. FIG. 2 and the related discussion provide a brief, general description of a suitable computing environment 20 in which the invention can be implemented. The computing system environment 20 is only one example of a suitable circuit arrangement and is not intended to suggest any limitation as to the scope of use or functionality of the invention. Neither should the computing environment 20 be interpreted as having any dependency or requirement relating to any one or combination of components illustrated in the exemplary operating environment 20.

The invention is operational with numerous other general purpose or special purpose circuits or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like. In addition, the invention may be used in a telephony system.

The invention may be described in the general context of computer-executable instructions, such as application modules, being executed by a computer. Generally, application modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. Tasks performed by the programs and modules are described below and with the aid of figures. Those skilled in the art can implement the description and figures as processor executable instructions, which can be written on any form of a computer readable media.

With reference to FIG. 2, the exemplary system for implementing the invention includes a general-purpose computing device in the form of a computer 30. Components of computer 30 may include, but are not limited to, a processing unit 40, a system memory 50, and a system bus 41 that couples various system components including the system memory to the processing unit 40. The system bus 41 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 30 typically includes a variety of computer readable media. Computer readable media can be any available media that can be accessed by computer 30 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 20. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 50 includes computer storage media in the form of volatile and/or nonvolatile memory such as read only memory (ROM) 51 and random access memory (RAM) 52. A basic input/output system 53 (BIOS), containing the basic routines that help to transfer information between elements within computer 30, such as during start-up, is typically stored in ROM 51. RAM 52 typically contains data and/or program modules that are immediately accessible to and/or presently being operated on by processing unit 40. By way of example, and not limitation, FIG. 2 illustrates operating system 54, application programs 55, other program modules 56, and program data 57.

The computer 30 may also include other removable/non-removable volatile/nonvolatile computer storage media. By way of example only, FIG. 2 illustrates a hard disk drive 61 that reads from or writes to non-removable, nonvolatile magnetic media, a magnetic disk drive 71 that reads from or writes to a removable, nonvolatile magnetic disk 72, and an optical disk drive 75 that reads from or writes to a removable, nonvolatile optical disk 76 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 61 is typically connected to the system bus 41 through a non-removable memory interface such as interface 60, and magnetic disk drive 71 and optical disk drive 75 are typically connected to the system bus 41 by a removable memory interface, such as interface 70.

The drives and their associated computer storage media discussed above and illustrated in FIG. 2, provide storage of computer readable instructions, data structures, program modules and other data for the computer 30. In FIG. 2, for example, hard disk drive 61 is illustrated as storing operating system 64, application programs 65, other program modules 66, and program data 67. Note that these components can either be the same as or different from operating system 54, application programs 55, other program modules 56, and program data 57. Operating system 64, application programs 65, other program modules 66, and program data 67 are given different numbers here to illustrate that, at a minimum, they are different copies.

A user may enter commands and information into the computer 30 through input devices such as a keyboard 82, a microphone 83, and a pointing device 81, such as a mouse, trackball or touch pad. Other input devices (not shown) may include a joystick, game pad, satellite dish, scanner, or the like. These and other input devices are often connected to the processing unit 40 through a user input interface 80 that is coupled to the system bus, but may be connected by other interface and bus structures, such as a parallel port, game port or a universal serial bus (USB). A monitor 84 or other type of display device is also connected to the system bus 41 via an interface, such as a video interface 85. In addition to the monitor, computers may also include other peripheral output devices such as speakers 87 and printer 86, which may be connected through an output peripheral interface 88.

The computer 30 may operate in a networked environment using logical connections to one or more remote computers, such as a remote computer 94. The remote computer 94 may be a personal computer, a hand-held device, a server, a router, a network PC, a peer device or other common network node, and typically includes many or all of the elements described above relative to the computer 30. The logical connections depicted in FIG. 2 include a local area network (LAN) 91 and a wide area network (WAN) 93, but may also include other networks. Such networking environments are commonplace in offices, enterprise-wide computer networks, intranets and the Internet.

When used in a LAN networking environment, the computer 30 is connected to the LAN 91 through a network interface or adapter 90. When used in a WAN networking environment, the computer 30 typically includes a modem 92 or other means for establishing communications over the WAN 93, such as the Internet. The modem 92, which may be internal or external, may be connected to the system bus 41 via the user input interface 80, or other appropriate mechanism. In a networked environment, program modules depicted relative to the computer 30, or portions thereof, may be stored in the remote memory storage device. By way of example, and not limitation, FIG. 2 illustrates remote application programs 95 as residing on remote computer 94. It will be appreciated that the network connections shown are exemplary and other means of establishing a communications link between the computers may be used.

Figure 3:
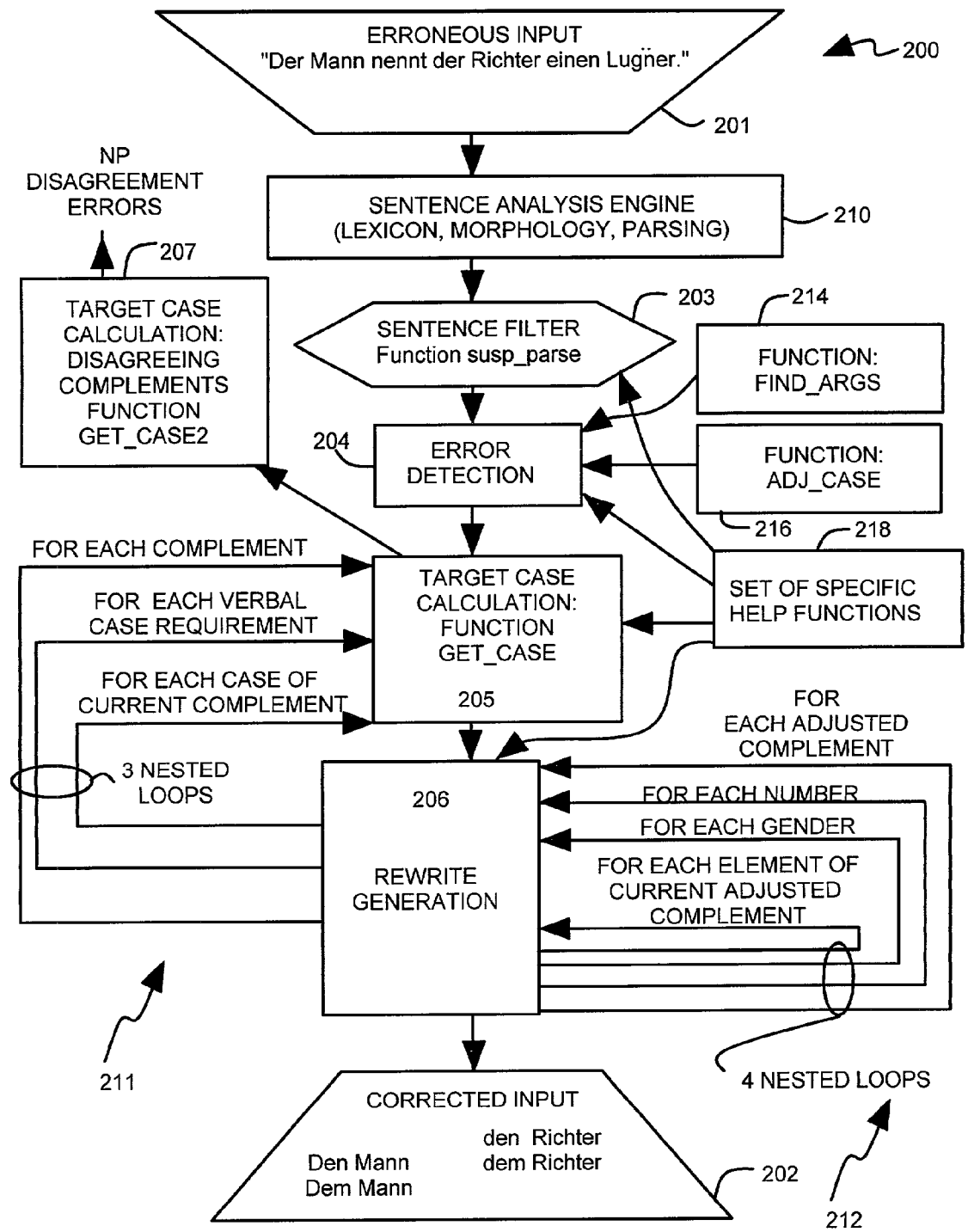
FIG. 3 illustrates a flow chart of procedural steps.

FIG. 3 illustrates a generalized flow chart 200 of procedural steps in an exemplary grammar checker. A text processing application, such as a word processor, provides German languages sentences one at a time to the grammar checker. As illustrated at 201, the word processor provides the sentence "Der Mann nennt der Richter einen Lügner" to the grammar checker. The sentence is passed on to a sentence analysis engine 210.

The sentence analysis engine 210 accesses a lexicon and word morphology (including declension and conjugation) stored on computer readable media. The sentence analysis engine 210 tentatively identifies parts of the sentence such as verbal phrases and the grammatical components of each verbal phrase such as verbs, nouns, adjectives, determiners, prepositions and the like. The sentence analysis engine 210 parses the sentence into individual verbal phrases if the sentence includes more than one verbal phrase. For each verbal phrase, the sentence analysis engine 210 also tentatively identifies a combination of a main verb, auxiliary verb and any subject, direct object, indirect object, adverb or prepositional phrase that is present (or implied) in the verbal phrase. The sentence analysis engine 210, based on this analysis of the sentence, generates a simplified grammatical model or combination of the verbal phrase.

The simplified grammatical model or combination includes identification of any tentatively identified subject, direct object and indirect object phrases (noun phrases) of the verbal phrase and the possible correct combination or combinations of noun phrases based on the main verb. The simplified grammatical model may also include other combinations of sentence structure. The simplified grammatical model is passed on to the suspicious sentence filter 203.

The suspicious sentence filter 203 identifies verbal phrases with combinations that are so complex or so unusual that there is a high risk that the grammar checker will not operate on the combination of the verbal phrase correctly. The suspicious sentence filter 203 skips over these high risk verbal phrases and does not pass them on for subsequent grammar checking routines. When the suspicious sentence filter 203 identifies phrases with combinations that are likely to be correctly handled by subsequent grammar checking routines, it passes them on to an error detection routine 204. The error detection routine has access to function find_args 214 and function adj_case 216 and a set of help functions 218. The error detection routine 204 is described in more detail in connection with FIG. 4.

The error detection routine 204 passes the verbal phrase combination on to a target case calculation function 205 designated as GET_CASE. If there are noun phrase disagreement errors, then the grammar checker does not attempt a grammar correction, but instead passes the verbal phrase to an NP disagreement checker at 207. The target case calculation is described in more detail in connection with FIG. 5. The target case calculation function 205 passes the verbal phrase combination on to rewrite generation function 206. Rewrite generation function 206 is described in more detail in connection with FIG. 6.

The rewrite generation function 206 provides suggested rewrites 202 to the word processor operator if there are errors in the case combination of the verbal phrase. The suggested rewrites 202 are changes to case ending that will conform the combination of noun phrase in the verbal phrase to one of the correct combinations of noun phrases that is indicated by the verb. In this example, the verb is "nennt." The word processor operator can then accept one of the suggested rewrites 202 and the verbal phrase in the word processor application is changed to correct the grammar. The word processor operator or user has access to an intended or presumed meaning of the verbal phrase and can productively select a rewrite consistent with the meaning.

As rewrites are generated in the rewrite generator 206, the program flow loops via three nested loops 211 back to the target case calculation 205 to make corrections as indicated in FIG. 3. Also, as rewrites are generated, the program flow loops back to make correction via four nested loops 212 as indicated in FIG. 3.

The grammar checker illustrated at 200 detects grammatical errors and offers appropriate corrections for such errors.

German is a language which extensively uses grammatical case endings in order to point out the different syntactical roles (meanings) of elements of a sentence. These case endings, or markers, allow for a very flexible word order and their correct usage is essential not only for the grammatical but also for the semantic soundness of a sentence. As one feature of the German grammar checker, incorrect combinations of grammatical case forms are identified and appropriate suggestions are calculated to correct the error.

The correctness of one grammatical case form can only be defined by the combination of all grammatical cases that are present in a sentence. Usually (unless preceded by a preposition), the verb of a sentence has certain requirements with respect to what cases are to be expected in a sentence. The steps performed by the computer can include, either alone or in various combinations, steps to (a) identify the verb, which determines the required cases by reference to a lexicon stored on computer-readable media, (b) identify all complements of the verb that carry a grammatical case, (c) define correct case-distributions for different scenarios (e.g. for sentences or phrases with or without a subject), (d) if the input sentence does not match any of the different scenarios, define the different suggestions to present to the user to correct the sentence, (e) define the preferred order in which the correction should be presented, (f) provide a display strategy for the presentation of the different suggestions, (g) deal with ambiguities, or (h) deal with exceptions.

A further broad aspect of the present invention includes a case calculation function 207 that can be used for the correction generation of a different kind of frequent grammar error, called "NP disagreement," which is grammatical mismatches of the elements that belong to a word group. For example, a noun phrase (NP) can be a word group that includes an article, adjectives and a noun which must agree with one another in grammatical number, gender and case. If the disagreement error in such a word group makes it difficult to tell what case was intended to be used, then the case calculation, which operates on the sentence or verbal phrase level, helps to make smarter suggestions. The solution which goes along with the calculation of the correct target case for an erroneous complement is preferred because it potentially contains information for several possible cases, which are only mutually exclusively correct.

Extra steps are taken during the calculation of the target case to present most likely scenarios to the user before less likely scenarios.

The detection and correction of case related problems are not well captured by generic algorithms with simple inflexible rules. Complicated sentence structures or incorrect parsing by the parser (i.e., incorrect sentence analysis by the parser) present the possibility of inappropriate flagging of grammar errors or inappropriate replacement suggestions to the user. In order to achieve acceptable precision for the treatment of (not only) case errors, a suspicious sentence filter 203 can be implemented which assigns penalty values to suspicious sentence structures or to elements, which easily are either misinterpreted or might have been wrongly disambiguated by the parser at 210. If a certain penalty value has been exceeded, the sentence will riot be checked for case errors. This filter function can significantly increase the precision for the case correction device.

The case calculation feature of the German grammar checker described here stands out in comparison with other grammar checkers that do not check and calculate case endings as a function of the verb requirements. The grammar checker offers a treatment of an error class which has been too complex to be effectively addressed by other grammar checkers. It not only offers the treatment of an error class which has been too complex to be automatically addressed so far, but it also provides enhanced rewrite suggestions of the error class.

Since the correct usage of German case forms is one of the core challenges of using the German language, especially for non-native speakers, this is a significant improvement in German grammar checking.

The actual problem of errors in case occurs frequently enough that it is a feature that most users would like to have it in a grammar checker, however, because of the complex nature of case relations in a sentence, it is hard to reach a satisfying precision rate. The solution to this problem is the implementation of code which takes user input and analyzes it with respect to the correctness of grammatical cases of all the contained verb complements, while ensuring that the system responses to the user are reliable.

If, for instance, a sentence contains three complements, as in "Die Frau gibt dem Mann den Mantel. (The woman gives the coat to the man.), the complements are "Die Frau" (the woman), dem Mann ([to] the man), "den Mantel" (the coat). If one of the complements carries the wrong case marking, it is not necessarily clear, which complement is the erroneous one. Due to the flexible word order in German, several solutions could be possible. The solution that is implemented in the German grammar checker preferably offers those solutions that will fix the entire sentence with respect to case assignment by making only one replacement. However there could be several possible single case replacements that would fix the sentence. To overcome this problem, the grammar checker uses heuristics that determine a first choice complement which is offered to the user first. Following these heuristics, the first complement can be highlighted and possible correction choices can be offered to the user in the most likely order. If the user decides that the highlighted complement does not contain an error, he or she may opt to ignore the highlighted complement and move forward to the next highlighted error. In one preferred embodiment, a maximum of three different locations in a sentence can be highlighted. As soon as the user accepts one suggestion, the sentence can be corrected and the user can move to the next highlighted error.

Using this approach, the grammar checker can include one or more of the following: (a) a pre-processing sentence filter at 203, (b) a module that identifies incorrect case-combinations in a sentence at 204, (c) calculation of sets of minimal solutions at 205, (d) ordering of these solutions at 206, or (e) making a comfortable and dynamic presentation to the user at 202.

An example of a problem that is handled by the grammar checker is illustrated in FIG. 3 with respect to an example German verbal phrase "Der Mann nennt der Richter einen Lügner." This sentence does not contain the case markings (ending) required by the verb "nennt". In addition, this verb has two meanings, (a) to call somebody something, and (b) to tell somebody the name of somebody/something. Each of the meanings requires a different combination of cases, which is taken into account by the case correction module. Due to the flexible German word order, it is not certain which of the complements requires correction.

The cases that are required by meaning (a) of the verb "nennen" are:
nominative (subject)
accusative (for the object that is called a name)
accusative (for the name that the object is called)

Since the object that is being called a name and the corresponding name are being made equivalent in a sentence that uses "nennen" with meaning (a), they have the same case because they share equivalent roles.

The cases that are required by meaning (b) of the verb "nennen" are:
nominative (subject)
dative (indirect object: name of something or somebody that is conveyed to the object shown below)
accusative (direct object: recipient of the information about the indirect object)

In English, indirect objects are usually introduced by a preposition, e.g. in "The man gives the book to the child," the phrase "to the child" would be translated into German as "dem Kind" without a preposition. The case marking found in the article "dem" (as opposed to "das" for example) is the only indicator of the role that "the child" is meant to play in the sentence, i.e. the child is the recipient of the direct object (the book).

In the example erroneous sentence, the cases are found to be:
Der Mann (nominative)
der Richter (nominative)
einen Lügner (accusative)

as illustrated at 201 in FIG. 3.

The case combination in the erroneous sentence at 201 does not fit either of the two possible correct case combinations that depend on the intended meaning, (a) or (b), of the sentence. Since the grammar checker does not have access to the writer's intended meaning, both meanings are dealt with by the grammar checker.

The grammar checker then generates possible error corrections in rewrite generation 206 with a minimal or single correction ("->") to the sentence as illustrated at 202:
(1) Nominative Der Mann-> Accusative Den Mann
Nominative der Richter
Accusative einen Lügner
(2) Nominative Der Mann
Nominative der Richter->accus. den Richter
Accusative einen Lügner
(3) Nominative Der Mann->dative Dem Mann
Nominative der Richter
Accusative einen Lügner
(4) Nominative Der Mann
Nominative der Richter->dative dem Richter
Accusative einen Lügner No attempt to fix the last complement "einen Lügner" would fix the sentence, because the two nominatives of the first two complements would still contradict every possible case combination. There are four replacement suggestions, but they affect only two complements, i.e. there are two different suggestions to present for each of the nominative complements. It is preferable to keep in mind that only one of the complements may be replaced because the sentence must have at least one nominative complement.

In a preferred embodiment, a preferred order in which the replacements are presented to the user is provided. The ordering decision is made on two levels, (a) the order in which the two affected complements will become highlighted to the user (flagged with a green grammar squiggle) and (b) the ordering of the replacement suggestions that can be offered to the user for each complement (made visible with a right mouse click on the highlighted complement string). The more frequent word order in German is the one in which the nominative complement is the first element in the sentence. Therefore, the nominative complement "der Mann" is less suspect to need correction because it is the first element. The other nominative complement "der Richter" is more suspect, is presented to the user as a possible error in the first instance. This goes against the usual grammar checking sequence of left-to-right, and additional logic is used to implement it. The user, however, is presented with more suspect choices first, which can save the user time and frustration. The order of presentation of errors is thus heuristic and based on the experience of which case errors are found to be more likely The presentation of replacement suggestions, however, is not strongly driven by heuristics, since either meaning is possible and the grammar checker does not have access to the user's intended meaning.

The resulting response of the grammar checker to the input error sentence can be, for example:
1. Place a green squiggle under "der Richter" with the two rewrite suggestions: den Richter and dem Richter. If the user selects "ignore", then:
2. Place a green squiggle under "der Mann" with the two rewrite suggestions: den Mann and dem Mann.

If the user accepts suggestion 1, then step 2 won't be activated because accepting the first suggestion corrects the sentence.

The case correction code can comprise three main components: (a) suspicious sentence filter 203, (b)error detection 204, (c) target case calculation and ordering 205, and (d) rewrite (replacement) generation 206.

The suspicious sentence filter 203 identifies correct sentences that are likely to be confused with sentences that contain a case error and is implemented in a module named Function: susp_parse(segrec seg). This function receives a sentence (or parts of a sentence) and calculates penalty values by assigning penalty points to "suspicious" characteristics that can be found in the sentence. These penalty points can be added together to provide return values, which will be able to block the grammar checker from checKing for certain error classes, especially the ones that need a reliable sentence structure to work with. It can deal with many individual known problems, difficulties, ambiguities and thus works like a control panel, with which coverage of input sentences can be individually regulated. Depending on how well the entire German grammar checker will be able to handle certain problems, penalty assignments can be adjusted as improved experience is obtained in other modules of the grammar checker on an heuristic basis.

Figure 4:
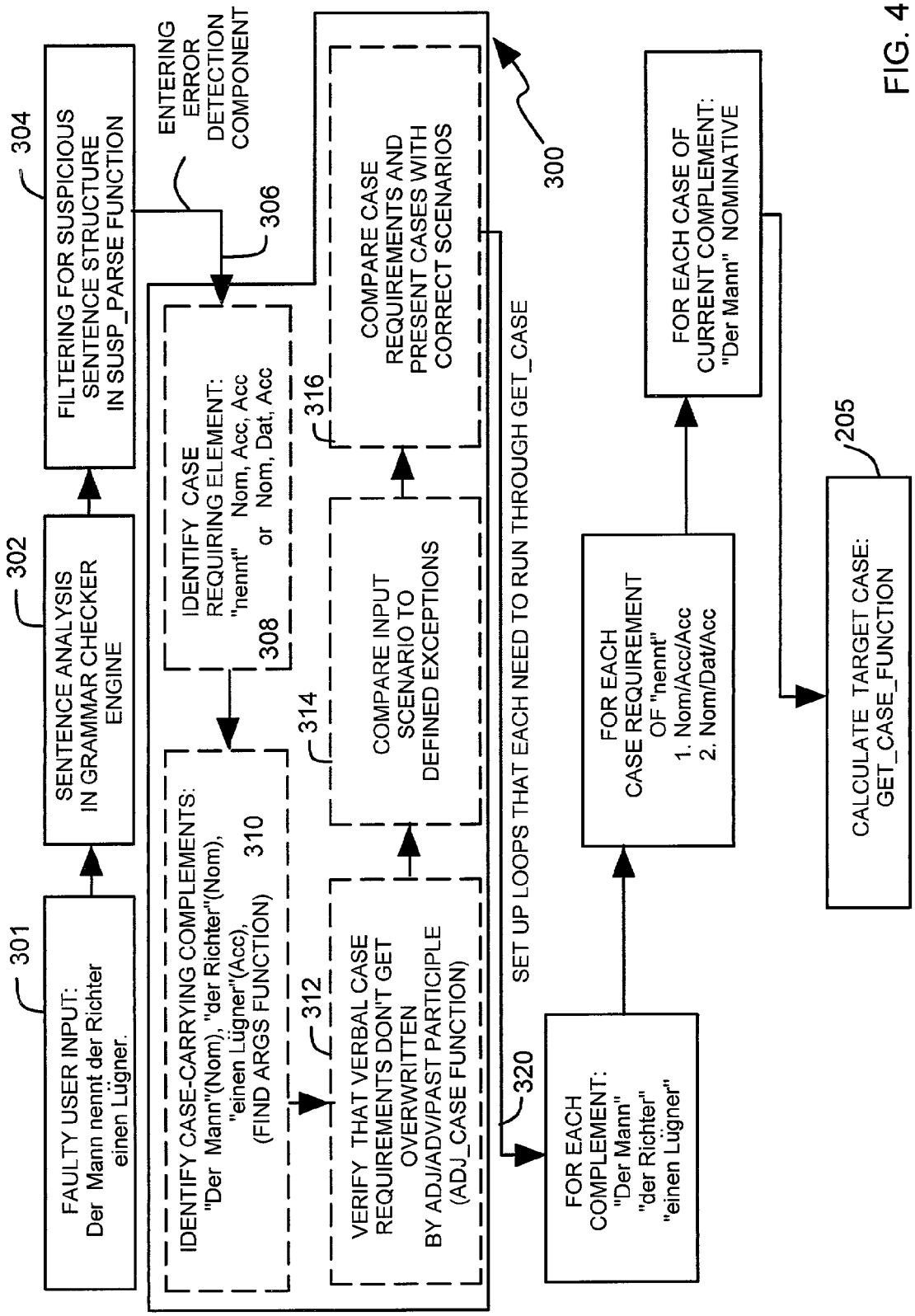
FIG. 4 illustrates a flow chart of error detection.

FIG. 4 illustrates a flow chart of error detection 300. In FIG. 4, process flow begins with a faulty user input 301 that corresponds generally with the erroneous input 200 in FIG. 3. The sentence or verbal phrase is analyzed at analysis engine 302 that corresponds generally with analysis engine 210 of FIG. 3. The verbal phrase is then passed on to suspicious sentence filter 304 that corresponds generally with sentence filter 203 in FIG. 3. Next, verbal phrases that are not suspicious are passed on to error detection 300 starting at 306.

As part of the error detection 300, an identification routine 308 identifies the element "nennt," which requires a certain case combination. An identification routine 310 identifies all of the complements that can satisfy the requirements of that element. In simple examples, the element requiring the case environment is usually the main verb of a sentence and the case carriers are the noun groups around it. For example: "Der Mann gibt der Frau ein neues Buch." (The man gives a new book to the woman).

gibt=a verb identified at 308 requiring a nominative, dative and accusative case complements Der Mann=nominative noun group (complement) identified at 310.

der Frau=dative noun group (complement) identified at 310.

ein neues Buch=accusative noun group (complement) identified at 310.

Since not all sentence structures are that simple, a special function list {segrec} find_args(segrec seg) at 310 finds the case-requiring elements and all the complements (or arguments) which belong to the scope of this element. Function: list {segrec} find_args(segrec seg) takes the input sentence and returns the list of arguments (i.e. complements) that need to have the correct case combination at 310. This special function at 310 helps distinguish the main verb from auxiliary verbs, it identifies subclauses that can take the role of a noun-group and adds them to the return list instead of the noun-complement. In coordinated structures with shared subjects, it adds the nominative-carrying sentence to the return list of each coordinated subsentence. For example, "Der Mann gibt der Frau ein neues Buch und [der Mann] kauft dem Kind ein Eis." (The man gives a new book to the woman and [the man] buys ice cream for the kid.)

In sentences that usually don't have an explicit subject (e.g. imperative sentences such as "Give me the book!"), the special function at 310 will temporarily add a fake (virtual or implied) subject to the return, so that the same rules can be applied to such sentences as to the sentences that do have a subject. This avoids using twice as much code in order to apply all of the tests for error detection and target case calculation to both types of sentences. This special function at 310 also deals with various grammatical exceptions and anticipates likely parsing errors (i.e. misanalysed sentence structures).

In some scenarios, the verb is not the crucial element requiring case, but it is an adjective. It is preferable to recognize when an adjective has the power to preempt the main verb's case requirements, because otherwise there will be a possibility of falsely flagging a correct sentence as incorrect. For example, "Das Pferd ist dem Mann zu teuer." (The horse is too expensive for the man.) The main verb of this sentence is "ist", which usually requires two nominatives (as in: "das Pferd ist (=) ein Sieger." The horse is (=) a winner.) However, in the first example, it is the comparative adjective ( "zu teuer") which allows for the dative complement ( "dem Mann"). If we would not recognize this, we would have to flag "dem Mann" and offer "der Mann" which would make a correct sentence incorrect.

Adjectives that require a certain case can have an appropriate annotation in the lexicon. However there are more adjectives that allow for a different case than the verb would require, and sometimes it happens that an adjective gets misanalysed as an adverb. In order to deal with such problems, a special function adj_case is provided at 312 that identifies cases that are inadmissible due to the presence of adjectives and adverbs: Function: atom adj_case(segrec seg) that receives the input sentence and returns an atom indicating the case(s) that can overwrite the main verb's case requirements.

In German, it is not always clear whether the past participle form of a verb should be analyzed as a main verb or an adjective. The error detection component identifies past participles which have been analyzed as adjectives and uses the case requirements of their verb-reading (verb form), in order to look for the correct case-set to go along with the verb form.

One characteristic of the German language makes it extremely challenging to deal with its grammatical genders: the use of the "free" dative. This is a dative complement which is not required by any element in the sentence, but it is often grammatically admissible. It is not always admissible, so scenarios were defined in which the presence of the dative complement may not be flagged as an error.

A list of exceptions can be included at 314 that helps identify words and circumstances which need specific adjustment of case requirements.

Since there is an infinite number of possible wrong scenarios, the error detecting component 316 contains a big set of correct case combinations against which the user input is compared to. If no correct scenario matches, an error is assumed and the target case calculation will be called.

The fact that an element that requires a certain case scenario can have several meanings makes it preferable to split up the information that belongs to each meaning and loop through them in order to deal with the separated case requirement information only. This looping is illustrated schematically starting at 320, and is also illustrated at 211 in FIG. 3. The same is valid for noun groups that can have more than just one case (e.g. "das Kind" can be either nominative or accusative). Such complements can only make use of one of its cases in the role that it plays in the sentence, but it is necessarily clear which one would be appropriate. In order to disambiguate and especially for the calculation of a correct target case combination, it is preferable to loop through the permutations of simultaneous case assignments. This looping is illustrated at 212 in FIG. 3.

A special challenge is posed by passive and infinitive sentences. The latter are highly ambiguous in their structure. It is preferable to identify all components that potentially belong to this sentence part (for they might be located on a level that is not directly accessible from within the infinitival sentence).

The passive sentences usually have different case requirements than their indicative counterparts. The proper translation of indicative case scenarios to passive ones has been effected at 316 in only a limited way due to the complexity of the problem.

Figure 5:
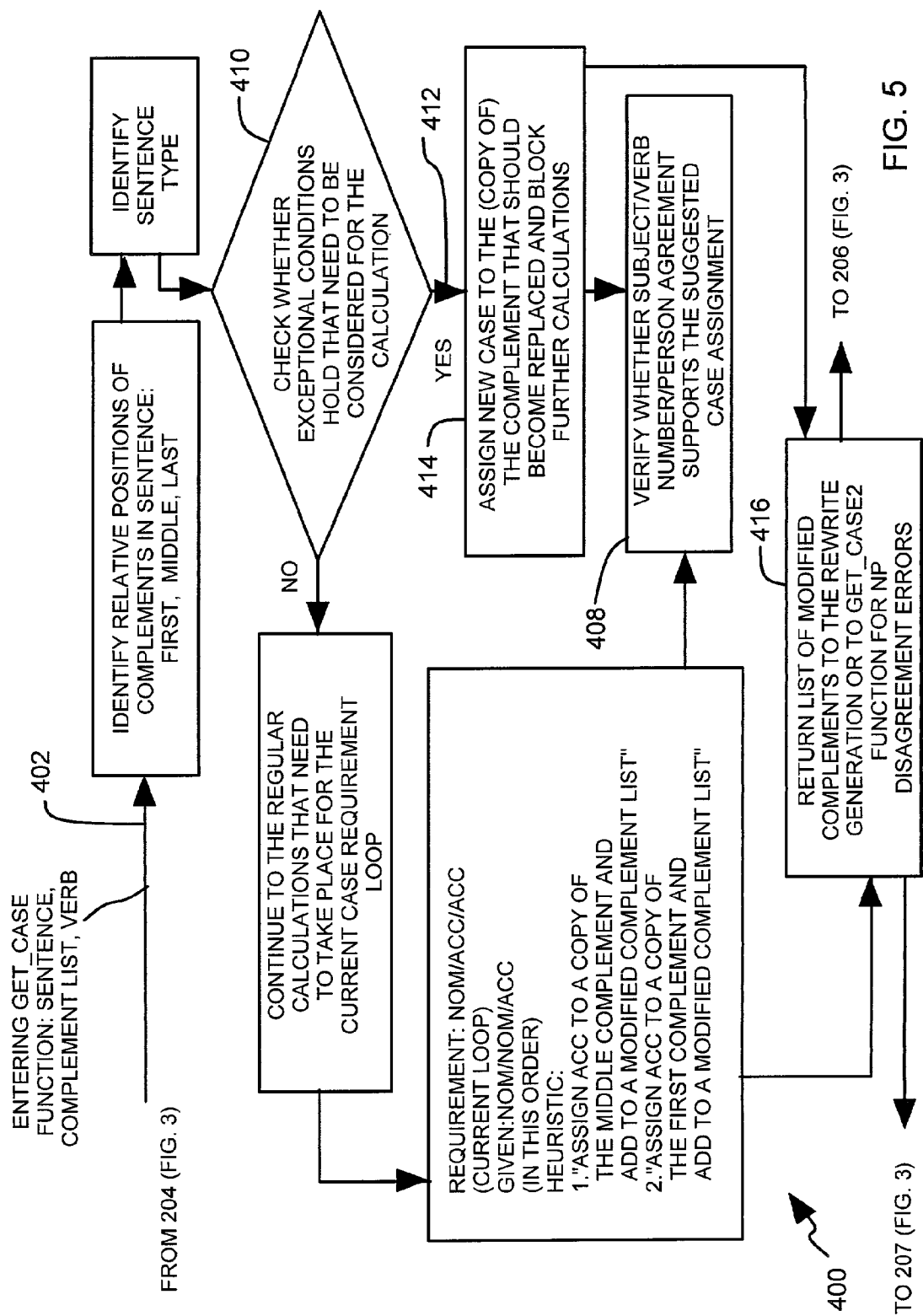
FIG. 5 illustrates a flow chart of target case calculation.

FIG. 5 illustrates a flow chart 400 of a target case calculation process.

The target case calculation is performed by a function called: list {segrec} get_case(segrec seg, segrec verb, list{segrec} arglist). The get_case function is started at 402.

The return value is a list of "segment records", i.e. records that describe sentence elements (here: the noun-groups or complements). This list contains the case-adjusted noun-group records that will be offered as replacement suggestions to the user. Segrec seg is a record containing the input sentence. Segrec verb is included in the list and is the verb that carries the target case requirement information. List {segrec} arglist is a list of arguments, i.e. noun-group records that have been identified by find_args-function.

This target case function walks through a similar set of scenarios as the error detection component (FIG. 4), in order to generate a correct set of cases in the list of complements at 416. However, the scenarios in target case calculation 400 are much more restricted because a just admissible scenario is not necessarily one that should be offered as a replacement. Therefore, the focus is on stricter requirements that will become satisfied with the changes that will be suggested.

One part of the target case calculation 400 is the verification of the subject/verb number/person agreement at 408. For instance, if we have two potential nominative complements, but only one of these shares the same number and person with the subject, then we would not want to replace the only matching nominative with any other case. Nominative complements need to agree with the verb. In the event that the grammar checker suggests a different case for the only agreeing nominative noun-group or in the event that the grammar checker tries to offer a nominative rewrite for a plural complement, while the verb is singular, the grammar checker would in both cases create a new error. Therefore the subject/verb agreement check at 408 factors in the target case calculation for new suggestions.

Since the grammar checker preferably does not correct a sentence which contains more than one case error, i.e. sentences which cannot be fixed with one replacement, treatable error scenarios have been defined in the target case function 400. These definitions are not as specific as the correct case definitions in the error detection part, but they help to avoid the attempt of making incomplete or incorrect recommendations. They further build one basis of the ordering heuristics, which allows the program to determine in which order the complements shall be returned by the function. This order is the one that is then displayed to the user.

Extensive treatment of grammatical exceptions helps restrict the replacement possibilities to only the required ones. It is preferred to be confident about the correction that will be offered to the user. If no certain recommendation can be calculated at 410, the function will exit with an empty list at 412, which will force the case correction device to stop or block further calculations at 414. This is not only a safety catch for unverified corrections, but also an additional way to avoid false flagging on correct input. If for some reason a correct sentence cannot match any of the defined correct case environments (the sentence might be highly elliptic, misparsed, or use a very rare structure), it still won't highlight any complement in the sentence, unless a replacement suggestion succeeds to match the strict requirements that have been defined in the get_case-function.

The target case calculation is very complex because it cannot simply loop through the list of complements and assign all (mathematically) possible combinations of cases. In order to determine the best ordering heuristics it is preferable to know about the exact positioning of each complement in the sentence (in relation to each other).

The accessibility of the concrete complements will make it easy to further fine-tune replacement conditions under consideration of semantic aspects (which currently is only done on a basic level).

The same results that get_case calculates are also used by the component 207 in FIG. 3, which handles NP disagreement errors (i.e., agreement mismatches within one noun group (NP)). Since in such cases the question is not which complement needs replacement, but only which cases help to suggest a well-formed NP in the context of the environmental sentence, the NP disagreement component needs a different return value that the case correction component. Therefore, an encapsulating function is used: Function: list{atom} get_case2(segrec seg). This function takes the disagreeing NP as input and finds the environment in which the disagreeing NP needs to be assigned an appropriate case, as well as the case-requiring verb. With this information, all arguments needed by the get_case function becomes available and it can be used to calculate the possible target cases for our disagreeing NP (some extra functions are used in get_case for the mismatching information in the disagreeing complement, but other than that all the basic checks were equally applicable). The record list returned by get_case will then be translated into a more appropriate return value for the NP disagreement component: A list of atoms (=string-like data type) representing the target case(s) that are possible for the rewrite of the disagreeing NP.

Even though the coverage for the case correction itself is lower for complicated input, which would get filtered out at the beginning, the coverage for NP disagreement errors is fairly high, which supplied even more evidence that the case calculation results have a high success rate.

Figure 6:
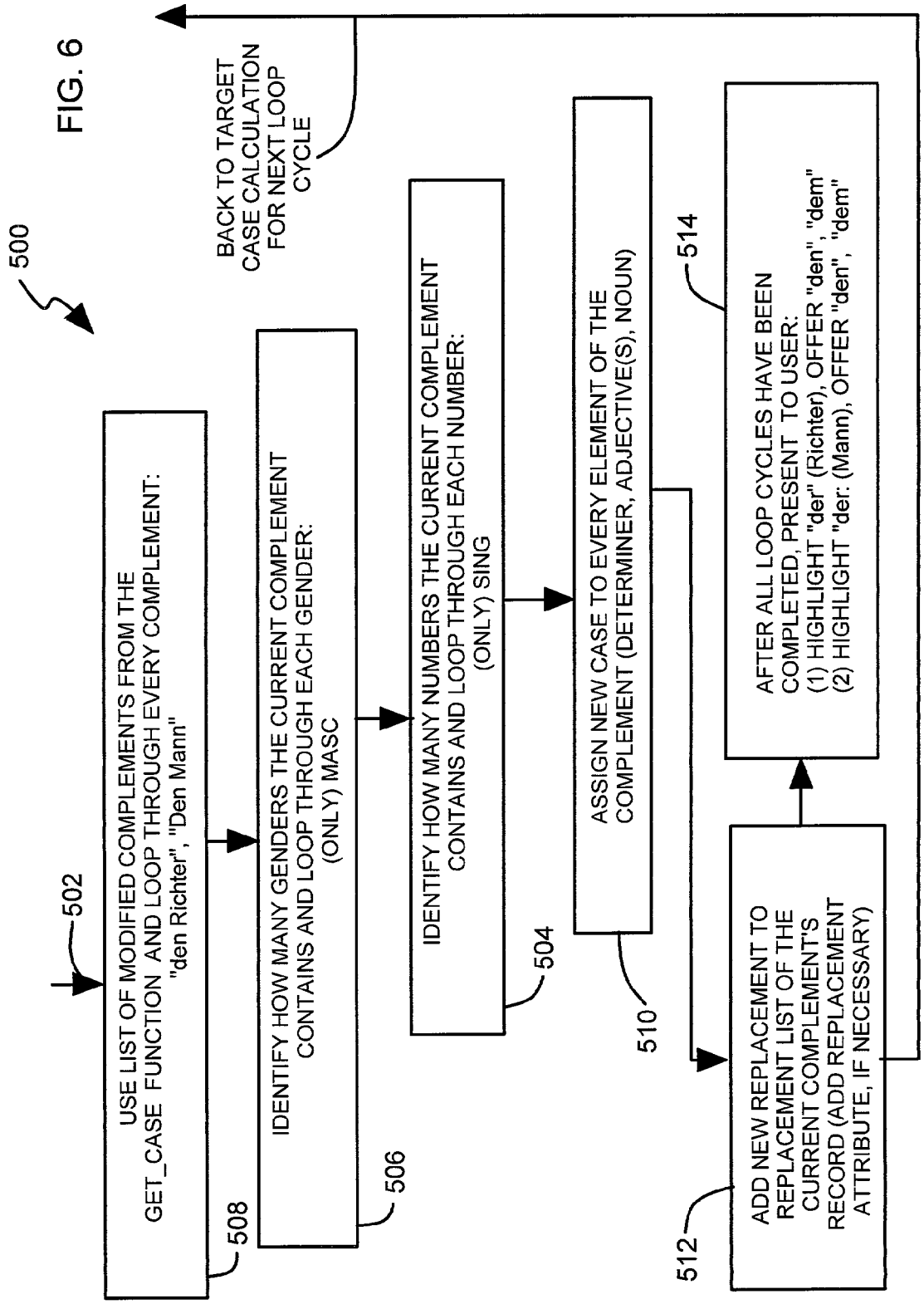
FIG. 6 illustrates a flow chart of rewrite generation.

FIG. 6 illustrates a flow chart 500 of rewrite generation. The result of the get_case-function (NP-list) 502 is passed to a component which will make the desired adjustments to every element of the list elements (i.e., noun-groups) and which controls the display of multiple replacement suggestions for list elements.

The component loops through the NP-list and, for each list element (noun group), loops through every element that the noun group includes.

For example, "das neue Buch" (the new book) is a noun group, which could be part of the NP list. It comprises a determiner (article) "das", an adjective "neue", and a noun "Buch".

Every one of these elements needs to be assigned a new target case which has been passed from get_case as one of the annotations on the record "das neue Buch". In some situations, the number and gender of a noun group is not unique. For example, "Angestellten" could be the plural form for "employees" (all cases), the dative or genitive singular form for a female "employee" or the accusative singular form for a male "employee". When we have a prior case error, we might have to consider more than one gender in the rewrite. Therefore, the case assignment procedure loops through:

every noun-group in the NP list at 502
every number of the noun group (unless the target case is nominative, then the verb dictates the target number) at 504
every gender of the noun group at 506, and
every element that the noun group comprises at 508.

The adjusted noun-group record will then be assigned an attribute or case at 510, which contains the exact replacement instructions. The steps 508, 506, 504, 510 in FIG. 6 correspond generally to the four nested loops 212 in FIG. 3.

This replacement attribute takes a list of possible replacements as a value. The first calculated replacement will be added at 512 and displayed at 514 on top of a list of possible multiple suggestions. If a replacement attribute already exists in the record, then the further elements in the replacement list will be marked as alternative replacement, so they won't trigger a new highlight squiggle, but appear below the first replacement suggestion in a drop down menu.

As explained above, the error detection module (which calls the get_case function) loops through different verbal cases-scopes as well as ambiguous case assignments to noun-groups. Therefore the get_case function might be called several times and return several lists containing records that should be replaced. It is possible that a complement will be contained in the list with the same new case assignment, which it already had in a prior list that was sent through the rewrite generation. Therefore, every adjusted complement is saved in a storage list to compare new list elements against. This way the program not only protects against redundant repeating of rewrite suggestions, but also serves a better performance by filtering out what need not go through the case assignment loops. Alternative replacement suggestions can still be added, even after a number of get_case loops. The assignment of the replacement attribute is connected to the position of the record in the sentence, therefore alternative replacements will preferably be correctly recognized as such and added to the appropriate list.

The reason for offering replacements only for sentence elements, even though the error can occur in the case combination of an entire sentence, is the following: German sentences often tend to be fairly long. It serves the clarity of the grammar problem when we try to point out and highlight to the minimal error location, even if there is more than one mutually exclusive error location. The scenario that would replace the entire sentence would not be sufficiently applicable because a practical implementation limits the number of rewrites offered to the user to only three. In our initial example, a rewrite of the whole sentence would require display of four replacement suggestions:

Der Mann nennt den Richter einen Lügner.
Der Mann nennt dem Richter einen Lügner.
Den Mann nennt den Richter einen Lügner.
Dem Mann nennt den Richter einen Lügner.

In a scenario where we could have replacement suggestions for all three complements (still one at a time) and two verbal case scopes, the number would increase to nine suggestions. Especially with long sentences, it would be much more inconvenient for the user to read through al the examples, if all were offered simultaneously. With the practical limitation of offering the user only three suggestions, the correct one could be missed if only three of the nine possibilities were displayed.

FIG. 7 illustrates a block diagram of a second exemplary grammar checking circuit.

In FIG. 7, a grammar checking circuit includes a power supply and sequencing circuit 104 that energizes and sequences the operation of other circuit elements. The circuit in FIG. 7 implements a process like that illustrated in FIGS. 3–6 in a computer environment such as that illustrated in FIG. 2, for example. Storage circuit 110 stores a word processor file which includes text sentences and text formatting. The storage circuit 110 provides the text sentences along data bus 112 to storage circuit 114. Storage circuit 114 stores the sentences as a list of sentences so that sentences can be conveniently selected one-at-a-time as input data for grammar testing in other circuits. Storage circuit 114 provides sentences in sequence, one-at-a-time along data bus 118 to parser circuit 120. Parser circuit 120 parses a text sentence into verb phrases. In performing the parsing operation, parser circuit 120 accesses grammatical information concerning words used in the sentence via bus 130 from a detailed lexicon stored in storage circuit 148. Parser circuit 120 also accesses commonly used idiomatic information along bus 132 from a list of language heuristics stored in circuit 152. The parser circuit 120 provides verbal phrases sequentially, one-at-a-time along data bus 128 to a storage circuit 134 which stores the verbal phrases. Parser circuit 120 is triggered or controlled to provide verbal phrases by a trigger signal received on line 122 from target case calculator 138 or it can be triggered by a trigger signal received on line 124 from keyboard 164. When one verbal phrase has been checked grammatically, if the phrase is found to be grammatically correct, then the trigger is provided along line 122. If the phrase in found to be grammatically incorrect, then the parser waits for a trigger from the keyboard 164. When parser circuit 120 has no new phrases to provide on bus 128, then parser circuit 120 provides a trigger along line 116 to storage circuit 114 to provide the next sequential sentence to be parsed.

The target case calculator circuit 138 identifies the verb of the verbal phrase received along bus 136. The identified verb is provided along line 144 to the lexicon stored in circuit 148. The lexicon provides data along line 146 indicating the grammatically correct combinations of cases that are possible with the identified verb. The target case calculator circuit 138 compares the grammatically correct combinations of cases with the combination of cases in the verbal phrase received from bus 136. If the verbal phrase is grammatically correct, then no further action is needed, and the verbal phrase is cleared from the target case calculator circuit and an output is provided at 140 to provide a trigger along line 122 to the parser circuit 120 to provide the next verbal phrase. If, on the other hand, the phrase is grammatically incorrect, then the incorrect phrase is provided on bus 142 along with the possible combinations of corrections to grammatical case ending to language heuristics circuit 152. Language heuristic circuit 152 takes into account the word order used in the sentence and selects the two most likely corrections. The incorrect phrase and the two most likely corrections are provided along bus 154 to display 156. Display 156 displays a portion of the original word processor file received from bus 106, highlights the incorrect phrase, and the two most like corrections received from bus 154. The display 156 is seen by a user 160 along line of sight 158. The user 160, who does have access to the intended meaning from the context of the original word processor file provides an actuation 162 to the keyboard 164 to either select one of the corrections, make other corrections, or make no corrections. The changes are coupled along line 108 to change or correct the word processor file stored in circuit 110.

The currently selected sentence is indicated on line 126 so that the display 156 displays the corresponding portion of the word processor file.

As illustrated in FIGS. 1–7, a method and an apparatus for grammar checking a German language sentence is described. The grammar checker parses the sentence into a verb phrase and an initial noun phrase combination associated with the verb phrase. The grammar checker accesses a morphology table to define an initial case combination associated with the initial noun phrase combination. The grammar checker accesses a lexicon to define a correct case combination associated with the verb phrase. The grammar checker compares the initial case combination to the correct grammatical case combination and generates a case error combination The grammar checker generates a combination of sentence rewrites that includes a grammatical case change to one noun phrase that corrects the case error combination.

Although the present invention has been described with reference to preferred embodiments, workers skilled in the art will recognize that changes may be made in form and detail without departing from the spirit and scope of the invention.

What is claimed is:

1. A computerized method of grammar checking a German language sentence, comprising:
   parsing the sentence into a verb phrase and an initial noun phrase combination associated with the verb phrase;
   accessing a morphology table to define an initial case combination associated with the initial noun phrase combination, the morphology table including case endings for nouns, adjectives and determiners that are not unique to a particular case, and tables for verbs including expected cases of complements of verbs;
   accessing a lexicon to define a correct case combination associated with the verb phrase;
   comparing the initial case combination to the correct case combination as a function of the case endings and the expected cases and generating a case error combination; and
   generating a combination of multiple sentence rewrites that each includes a change of case endings in one noun phrase that corrects the case error combination.

2. The computerized method of grammar checking of claim 1, further comprising:
   displaying the sentence rewrites in an order from the most likely changes of case endings to the least likely changes of case endings to be accepted by a user.

3. The computerized method of grammar checking of claim 1, further comprising:
   limiting the number of sentence rewrites presented to no more than three rewrites per noun phrase.

4. The computerized method of grammar checking of claim 1, further comprising:
   including a subject and any direct object and any indirect object associated with the verb phrase in the correct case combination.

5. The computerized method of grammar checking of claim 1, further comprising:
   generating the case error combination of changes to case endings without access to the meaning of the sentence.

6. The computerized method of grammar checking of claim 1, further comprising:
   including corrections to the case endings of determiners, adjectives and nouns in the noun phrase combinations in the sentence rewrites.

7. The computerized method of grammar checking of claim 1 where the German language sentence has an implied subject, and further comprising:
   inserting a fake subject in the initial noun phrase combination to facilitate the comparing.

8. The computerized method of grammar checking of claim 1, further comprising:
   filtering out of any sentence with a suspiciously complex combination before the comparing.

9. The computerized method of grammar checking of claim 1, further comprising:
   detecting noun phrase (NP) disagreement in the sentence and filtering out the sentence before the comparing.

10. A computerized grammar checker for a German language sentence, comprising:
    a lexicon and a morphology table stored on a computer readable medium, the morphology table including case endings for nouns, adjectives and determiners that are not unique to a particular case, and tables for verbs including expected cases of complements of the verb;
    a sentence analysis engine receiving the sentence and generating a parsed initial noun phrase combination and a verb phrase, the sentence analysis engine accessing the morphology table and providing an initial case combination associated with the initial noun phrase combination;
    an error detecting function accessing the lexicon and generating a correct case combination associated with the verb phrase as a function of the case endings and the expected cases; the error detecting function comparing the initial case combination to the correct case combination and generating a case error combination;
    a target case calculation function generating a combination of multiple sentence rewrites that each includes a change of case endings in one noun phrase that corrects the case error combination.

11. The computerized grammar checker of claim 10, further comprising:
    a display of the sentence rewrites in an order from the most likely changes of case endings to the least likely changes of case endings to be accepted by a user.

12. The computerized grammar checker of claim 10, further comprising:
    a display of sentence rewrites limited to no more than three rewrites per noun phrase.

13. The computerized grammar checker of claim 10 wherein the correct case combination includes:
    a subject and any direct object and any indirect object associated with the verb phrase.

14. The computerized grammar checker of claim 10 wherein the case error combination is generated without access to the meaning of the sentence.

15. The computerized grammar checker of claim 10 wherein the sentence rewrites include:
    corrections to the case endings of determiners, adjectives and nouns in the noun phrase.

16. The computerized grammar checker of claim 10 where the German language sentence has an implied subject, and the parsed initial noun phrase combination includes:
    a fake subject inserted in the initial noun phrase combination to facilitate the comparing.

17. The computerized grammar checker of claim 10, further comprising:
    a filter removing any sentence with a suspiciously complex combination before the comparing.

18. The computerized grammar checker of claim 10, further comprising:
    a detector of noun phrase (NP) disagreement in the sentence and a filtering out the sentence before the comparing when there is noun phrase disagreement.

* * * * *